Patented Aug. 8, 1939

2,169,051

UNITED STATES PATENT OFFICE 2,169,051

REDUCING-SUGAR PRODUCT

David P. Langlois, Decatur, Ill., assignor to A. E. Staley Manufacturing Company, Decatur, Ill., a corporation of Delaware No Drawing. Application March 19, 1937, Serial No. 131,935

7 Claims. (Cl. 127—38)

The present invention relates to the production of a dextrose product by the conversion of starch and has particular reference to an improved process in which a product of relatively high content of reducing sugars is obtained, which sugars have a reduced tendency with respect to crystallization.

A principal object of the invention is to provide an improved reducing sugar product and method of making the same, in which the dextrose equivalent content of the product is relatively high and the product is of a more liquid character than products of the same dextrose equivalent analysis and concentration known heretofore.

An additional object is the provision of an improved conversion method wherein a starch suspension is treated with an acid in the presence of molybdenum compounds to inhibit crystallization of the resulting reducing sugar product.

Another object is the production of a starch conversion product having a relatively low specific rotation for the dextrose equivalent content thereof.

In the conversion of a starch suspension to a solution of reducing sugars a corn starch suspension is treated with an acid such as hydrochloric acid under suitable conditions of temperature and pressure. The nature of the conversion product depends upon largely the extent to which the acid treatment is carried out. To produce ordinary confectioner's glucose the conversion is stopped by neutralization before the dextrose equivalent content of the conversion product has reached an extent where taste-imparting substances are produced. The resulting product is a colorless solution which ordinarily is concentrated to approximately 43° Baumé. At this concentration there is no tendency on the part of the reducing sugars contained in the glucose to crystallize. The term "glucose" is used herein with reference to starch conversion products of this confectioner's glucose type.

In the production of crystalline dextrose the acid conversion is carried considerably further than in the production of glucose. The products known as "70" and "80" sugars set up into rigid crystalline masses when allowed to cool. Customarily, these products are poured in a hot liquid form, allowed to set up, and stored and shipped in solid blocks. This requires a considerable amount of handling and re-melting when the product is utilized for such purposes as producing alcohol.

I have found that a product of some different characteristics may be obtained by carrying out the conversion in the presence of molybdenum, preferably in the form of its compounds. Under such conversion of starch by hydrochloric acid as ordinarily practiced in the industry, a liquor having been hydrolyzed to an extent sufficient to give a dextrose equivalent of 88.5 per cent will have a specific rotation of about 56.5°. The term "dextrose equivalent" is understood in the art and is used herein as meaning reducing sugars content as determined by copper reduction and calculated as dextrose on a dry basis. Where the conversion process is carried out in the presence of molybdenum in the form of its salts a liquor of the same dextrose equivalent analysis will have a specific rotation considerably lower than 56.5° and this specific rotation may average as low as 44°.

Accompanying the low specific rotation of liquors converted in the presence of molybdenum compound is a reduced tendency for crystallization. That is, higher dextrose equivalent content products obtained by conversion in the presence of molybdenum salts will crystallize less readily than ordinary dextrose conversion products of the same purity. In the higher purity range of 87 per cent to 90 per cent a normally converted product will crystallize to a hard dense mass when the water content of the liquor is reduced to the extent ordinarily practiced in the industry and the liquor is allowed to cool. A product of this dextrose equivalent analysis converted in the presence of molybdenum crystallizes quite slowly and finally produces a soft mass which may be re-melted easily. This makes it possible to ship high dextrose equivalent conversion liquors in tank cars. Such products may reach the customer in a liquid form, or, if it is set up to a soft crystalline mass, the mass may be melted and removed from the tank in liquid form without great difficulty. Thus, high dextrose equivalent syrups may be produced in the presence of molybdenum salts and evaporated to 40° to 45° Baumé. The resulting mass will remain liquid for a considerable period of time and if it crystallizes the crystalline mass will have a soft consistency which is permanently workable.

The product resulting from conversion of starch in the presence of the salts or other compounds of molybdenum has a high content of fermentable substances so that the amount of alcohol produced by fermentation of the low polarizing, crystallization-inhibited syrup compares favorably with the normally produced starch-hydrolyzed liquor of corresponding dextrose equivalent content.

In the lower dextrose equivalent range the relation between dextrose equivalent content and polarization in normally hydrolyzed starch liquors and liquors hydrolyzed in the presence of molybdenum compounds may be close together. At a dextrose equivalent analysis of about 50 a recognizable divergence appears and this divergence becomes pronounced as the dextrose equivalent increases. A preferred product produced in accordance with the process described herein consists of a starch-converted liquor within the dextrose equivalent range of 85 and 90, the starch having been hydrolyzed by an acid in the presence of a molybdenum compound. This product will be a high dextrose equivalent, high fermentable syrup of slow crystallizing tendency and of such limited crystallizing power that the final product sets into a soft fondant or massecuite.

With a normal converted starch liquor the purity point at which crystallization may be expected to occur to an objectionable extent lies at about 66. This corresponds to a fermentable extract of about 62.5 per cent. A syrup which will not crystallize may be produced in accordance with my process having a dextrose equivalent analysis of 70 and a fermentable extract of about 66. Thus, it is possible to produce a fermentable liquor having a dextrose equivalent of substantially more than 66 and a fermentable extract of substantially more than 62.5 per cent which will not crystallize, by converting the starch suspension from which the liquor is produced in the presence of a molybdenum compound catalyst. For producing non-crystallizing syrups, it is desirable to carry the conversion in the presence of molybdenum to an extent sufficient to provide a purity of between 68 and 72. This product may be concentrated, for example, to between 40° and 45° Baumé. The amount of fermentable material in liquors produced in accordance with my process may be greater for the same dextrose equivalent content than in the case of liquors converted normally.

In effecting the conversion, the amount of molybdenum catalyst employed may be of the order of 0.013 per cent of the starch converted, the percentage stated being expressed as molybdenum. If substantially lower quantities of the catalyst are employed the desired results cannot be obtained in a reasonable time. Substantially larger quantities become uneconomical. The catalyst may be present in the form of sodium molybdate or other molybdates or compounds of the metal. Molybdic acid and compounds of molybdenum with the halogens may be employed. Other molybdenum compounds include the oxides. A certain amount of these oxides may be formed by the conversion acid from other molybdenum compounds added to the starch suspension. The conversion may be carried out by hydrochloric acid, as is customary in the industry, although other acids such as sulfuric acid may be employed.

As an example of the process the starch slurry having a Baumé of 15.5°, which corresponds to approximately 28.9 per cent dry moisture starch, in the quantity of 4400 gallons was placed in a conversion vessel and approximately 3.75 pounds sodium molybdate was added thereto. Approximately 215 pounds of 28 per cent muriatic acid was added. The slurry was first pasted in an open converter for 20 minutes. It then was placed in a closed converter at 45 pounds steam pressure for approximately 45 minutes, the time being controlled by determining the dextrose equivalent analysis of the liquor and continuing the conversion until the proper dextrose equivalent content was reached. The various procedures of operation ordinarily prevailing in a glucose refinery for such conversions were followed.

The conversion was terminated by neutralization with sodium carbonate and thereafter the liquor was purified by means of bone char filtration. The purified liquor was evaporated to 45° Baumé, at which point the product showed an analysis as follows:

Percentage of solids_____per cent___ 87.5
Dextrose equivalent_____do____ 89.5
Specific rotation_____do____ 44.0
Percentage of sodium chloride_____do____ .70
pH_____ 4.9

This product may be shipped in tank cars without setting up as a solid mass which cannot be removed.

The density, dextrose equivalent, and specific rotation can be varied by changing the time of conversion, the amount of molybdenum catalyst used and the extent of the final evaporation.

By the process described it is possible to produce a syrup having a dextrose equivalent content of 68 per cent to 92 per cent and a density of the order of 42° Baumé or higher without the formation of a rigid mass of crystals. An ordinary syrup of this dextrose equivalent content and concentration would set up as a solid crystalline mass. Thus, a product of intermediate dextrose equivalent content can be obtained which will not crystallize at all and a product of high dextrose equivalent content may be obtained which will have a retarded crystallization tendency and which will set up as a workable mass rather than as a solid rigid body as is the case with products produced by ordinary hydrolysis.

The specific rotation of ordinarily converted dextrose solutions is quite definite and by determining the specific rotation of such a solution the dextrose equivalent content of the solution can be estimated with accuracy. Likewise, if the dextrose equivalent content of a reducing sugar solution is known, the specific rotation can be estimated accurately. A liquor hydrolyzed in the presence of a molybdenum catalyst as described in the example given herein will have a lower specific rotation than ordinarily converted liquor and between the dextrose equivalents of 70 and 88 this difference may be tabulated as follows:

| Ordinary conversion | | Mo conversion | |
| --- | --- | --- | --- |
| Dextrose equivalent | Specific rotation | Dextrose equivalent | Specific rotation |
| 88 | 59 | 88 | 45 |
| 85 | 65 | 85 | 55 |
| 80 | 75 | 80 | 67.5 |
| 75 | 85 | 75 | 75.5 |
| 70 | 95 | 70 | 87.5 |

The specific rotation of the liquor produced by hydrolysis in the presence of a molybdenum catalyst is seen to be substantially less than an ordinary dextrose specific rotation, indicating that the reducing sugars formed in the presence of the molybdenum catalyst are of different structural characteristics than ordinary dextrose. This indication is further substantiated by the reduced tendency toward crystallization.

The amount of catalyst employed obviously may be varied with a corresponding variation in specific rotation and crystallization inhibition. A considerable portion of the molybdenum catalyst may be removed from the liquor during the filtration or purification steps following the conversion. Changes may be made in the procedure described without departing from the scope of the invention as defined in the appended claims.

I claim:

1. The process of producing a starch hydrolysis product, which comprises subjecting a starch suspension to saccharification in the presence of a molybdenum catalyst.

2. The process of producing a starch conversion product, which comprises subjecting a starch suspension to acid hydrolysis in the presence of a molybdenum compound, and carrying the conversion to an extent sufficient to provide a dextrose equivalent of more than 66 per cent.

3. The process of producing a starch conversion product which comprises subjecting a starch suspension to acid conversion in the presence of a molybdenum compound to produce a liquor having a dextrose equivalent content of from 68 to 72 per cent, and concentrating the resulting product to produce a non-crystallizing liquid.

4. The process of producing a starch conversion product, which comprises subjecting a suspension of starch to acid hydrolysis in the presence of a molybdenum compound to produce a liquor having a dextrose equivalent analysis of between 85 and 90, terminating the hydrolysis, and concentrating the resulting liquor to produce a slowly crystallizing mass which will set up in a workable non-rigid crystalline body at ordinary temperatures.

5. A starch conversion product, comprising a partially crystallized mass of reducing sugars produced by acid hydrolyzation of a starch suspension in the presence of a molybdenum compound, said mass having a dextrose equivalent content of between 85 and 90 per cent, and a specific rotation of substantially less than 56.5 per cent.

6. A starch conversion product, comprising a partially crystallized mass of reducing sugars produced by acid hydrolyzation of a starch suspension in the presence of a molybdenum compound, said mass having a dextrose equivalent content of between 85 and 90 per cent, and a specific rotation of not more than substantially 55.

7. A starch conversion product, comprising a non-crystallizing solution of reducing sugar produced by acid hydrolysis of a starch suspension in the presence of a molybdenum compound, said product having a dextrose equivalent content of between 65 and 70 per cent, a fermentable extract content of more than 62.5 per cent, and a lower specific rotation than that of a liquor of equivalent dextrose equivalent content converted in the absence of said molybdenum compound.

DAVID P. LANGLOIS.

CERTIFICATE OF CORRECTION.

Patent No. 2,169,051.  August 8, 1939.

DAVID P. LANGLOIS.

It is hereby certified that error appears in the printed specification of the above numbered patent requiring correction as follows: Page 1, second column, line 4, for the word "such" read normal; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.

specific rotation and crystallization inhibition. A considerable portion of the molybdenum catalyst may be removed from the liquor during the filtration or purification steps following the conversion. Changes may be made in the procedure described without departing from the scope of the invention as defined in the appended claims.

I claim:

1. The process of producing a starch hydrolysis product, which comprises subjecting a starch suspension to saccharification in the presence of a molybdenum catalyst.

2. The process of producing a starch conversion product, which comprises subjecting a starch suspension to acid hydrolysis in the presence of a molybdenum compound, and carrying the conversion to an extent sufficient to provide a dextrose equivalent of more than 66 per cent.

3. The process of producing a starch conversion product which comprises subjecting a starch suspension to acid conversion in the presence of a molybdenum compound to produce a liquor having a dextrose equivalent content of from 68 to 72 per cent, and concentrating the resulting product to produce a non-crystallizing liquid.

4. The process of producing a starch conversion product, which comprises subjecting a suspension of starch to acid hydrolysis in the presence of a molybdenum compound to produce a liquor having a dextrose equivalent analysis of between 85 and 90, terminating the hydrolysis, and concentrating the resulting liquor to produce a slowly crystallizing mass which will set up in a workable non-rigid crystalline body at ordinary temperatures.

5. A starch conversion product, comprising a partially crystallized mass of reducing sugars produced by acid hydrolyzation of a starch suspension in the presence of a molybdenum compound, said mass having a dextrose equivalent content of between 85 and 90 per cent, and a specific rotation of substantially less than 56.5 per cent.

6. A starch conversion product, comprising a partially crystallized mass of reducing sugars produced by acid hydrolyzation of a starch suspension in the presence of a molybdenum compound, said mass having a dextrose equivalent content of between 85 and 90 per cent, and a specific rotation of not more than substantially 55.

7. A starch conversion product, comprising a non-crystallizing solution of reducing sugar produced by acid hydrolysis of a starch suspension in the presence of a molybdenum compound, said product having a dextrose equivalent content of between 65 and 70 per cent, a fermentable extract content of more than 62.5 per cent, and a lower specific rotation than that of a liquor of equivalent dextrose equivalent content converted in the absence of said molybdenum compound.

DAVID P. LANGLOIS.

CERTIFICATE OF CORRECTION.

Patent No. 2,169,051.   August 8, 1939.

DAVID P. LANGLOIS.

It is hereby certified that error appears in the printed specification of the above numbered patent requiring correction as follows: Page 1, second column, line 4, for the word "such" read normal; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.